July 18, 1939.  L. R. KING  2,166,413
PLANTER
Filed May 27, 1937  3 Sheets-Sheet 1

Inventor
Lamar Ryan King

By Clarence A. O'Brien
Hyman Berman
Attorneys

July 18, 1939.   L. R. KING   2,166,413
PLANTER
Filed May 27, 1937   3 Sheets-Sheet 2

Inventor
Lamar Ryan King

By Clarence A. O'Brien
Hyman Berman
Attorneys

July 18, 1939.   L. R. KING   2,166,413
PLANTER
Filed May 27, 1937   3 Sheets-Sheet 3

Inventor
Lamar Ryan King

By Clarence A. O'Brien
Hyman Berman
Attorneys

Patented July 18, 1939

2,166,413

UNITED STATES PATENT OFFICE 2,166,413

PLANTER

Lamar R. King, Schlater, Miss., assignor of one-half to Webster M. Blain, Greenwood, Miss.

Application May 27, 1937, Serial No. 145,113

2 Claims. (Cl. 221—135)

This invention is a hill drop planter, and an object of the invention is to provide a planter of this character which is free of gearing as now characterizes hill drop planters, and which is also provided with improved means for dropping the seeds at predetermined intervals to insure a proper spacing of the seeds.

The invention, together with its objects and advantages will be best understood from a study of the following description in connection with the accompanying drawings, wherein:

Figure 6 is a fragmentary detail sectional view through the seed wheel showing a cup arrangement hereinafter more fully referred to.

Figure 1:
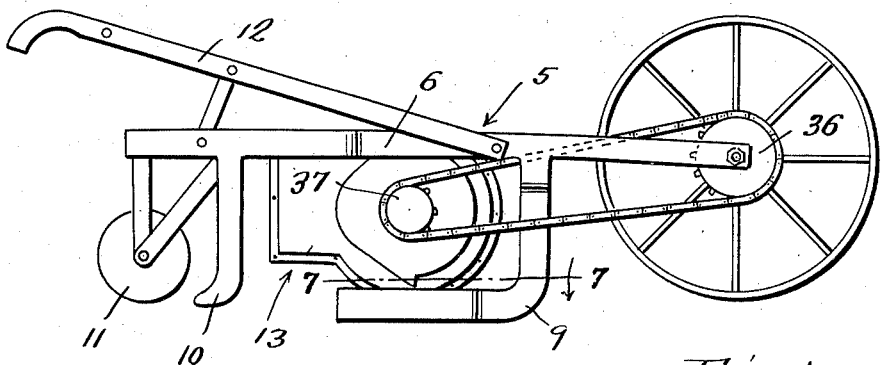
Figure 1 is a side elevational view of the planter.
Figure 2:
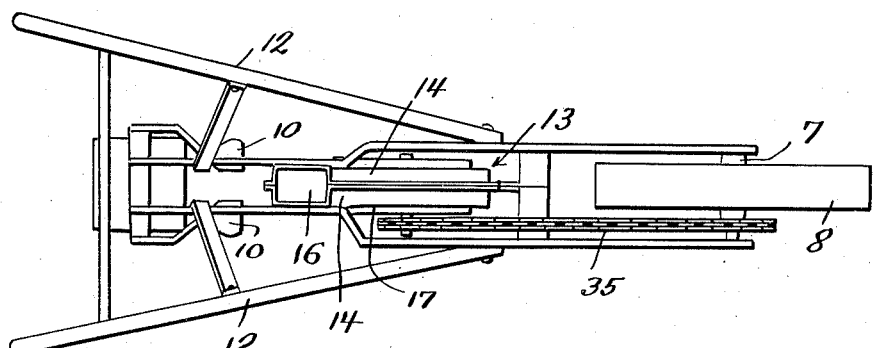
Figure 2 is a top plan view thereof.
Figure 7:
Figure 7 is a detail sectional view taken substantially on the line 7—7 of Figure 1.
Figure 3:
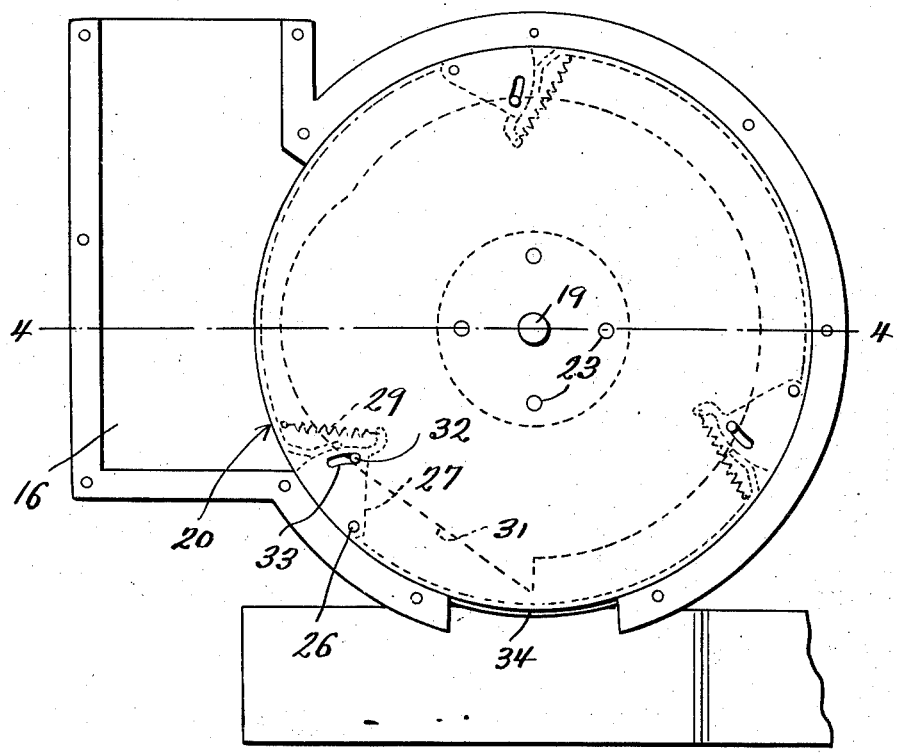
Figure 3 is a detailed elevational view showing a seed box and wheel assembly with one section of the seed box and wheel housing removed.
Figure 4:
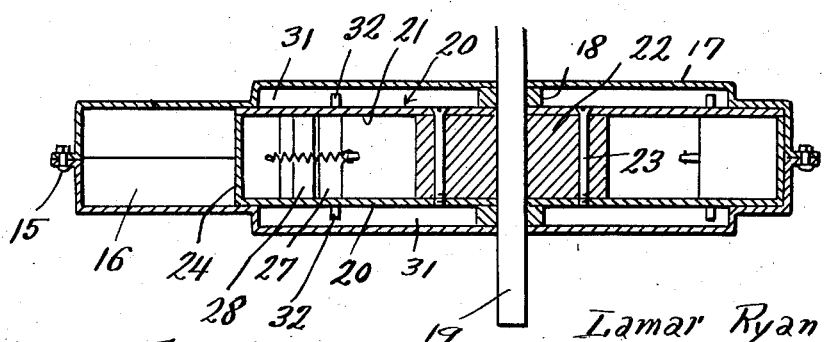
Figure 4 is a horizontal sectional view taken substantially on the line 4—4 of Figure 3.
Figure 5:
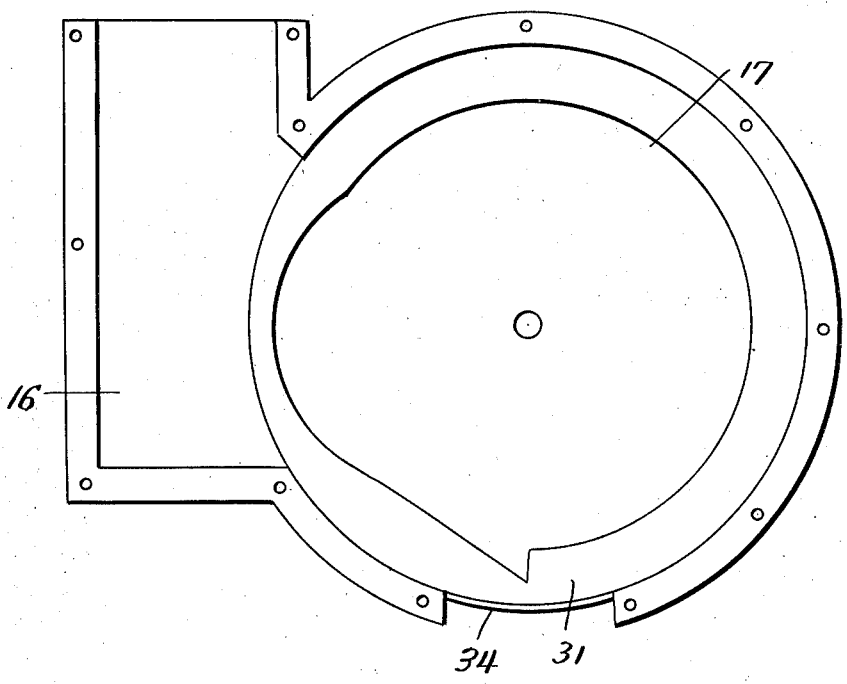
Figure 5 is an elevational view of the seed box and wheel housing with the cover plate therefor removed.

Referring to the drawings by reference numerals it will be seen that 5 designates a hill drop planter and is conventional insofar as it comprises a frame 6, front axle 7, treadwheel 8 mounted on the axle 7, sword opener 9 for making the opening for the seed, scarifiers 10 which throw fresh dirt on the seed, packer wheel 11, and handles 12.

In accordance with the present invention there is provided an improved seed box and wheel assembly indicated generally by the reference numeral 13.

The seed box and wheel assembly 13 is suitably mounted on the frame 6 in proper position relative to the sword 9 and scarifiers 10 and comprises a casing member formed of complemental sections 14—14 which at their meeting edges are flanged, through the medium of which the bolts or the like 15 the sections are secured together.

The casing or housing sections 14 are designed to present a seed box or hopper 16 that is open at its top, and a substantially circular wheel housing 17.

The wheel housing 17 is suitably equipped with bearings 18 to accommodate an axle 19 on which is mounted the seed wheel 20 for rotation with said axle.

The seed wheel 20 is hollow and comprises a pair of side plates 21, 21' bolted together and to a hub 22 through the medium of bolts 23. One of the plates, in the present instance, plate 21', is provided with a flange 24 that provides the rim for the wheel 20.

Figure 6:
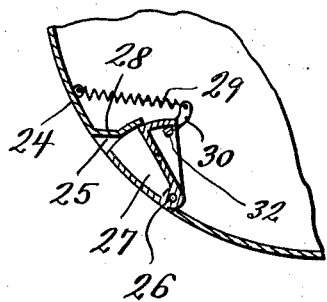

At intervals, the rim 24 of wheel 20 is provided with openings 25 and pivoted adjacent one end edge of each opening 25, as at 26, is a seed cup 27. At the edge of each opening opposite to the pivot 26, the rim 24 of the wheel is provided with an inwardly directed flange 28 which serves substantially to close the mouth of a cup 27 when the latter is in the inward position shown in Figure 6.

For each cup 27 there is provided within the wheel 20 a spring 29 anchored at one end to the rim of the wheel and at its relatively opposite end secured as at 30 to the cup. Spring 29 normally urges the cup 27 outwardly to a projected position with respect to the rim 24 of the wheel.

The opposed side walls of the wheel housing 17 are provided with cam grooves 31 in which operate pins 32 that extend laterally from opposite sides of the respective cups 27 and work in suitable slots 33 provided therefor in the sides of the wheel 20.

Also in the bottom thereof the housing or casing 17 for wheel 20 is provided with an opening 34, and as will be hereinafter made more manifest as each cup 27 comes into position opposite the opening 34 the spring 29 of the cup will act thereon to project the cup outwardly through the associated opening 25 in the rim 24 of the wheel and also through the opening 34 so that the seed contents of the cup will be dispensed therefrom.

The wheel 20 is driven from the traction wheel 8 through the medium of a sprocket chain 35 trained over a sprocket 36 on the axle 7 and also over a sprocket 37 on one end of the axle 19. Thus it will be seen that as the planter moves over the ground wheel 20 is rotated to bring the cups 27 successively opposite the opening 34 to discharge their seed contents into the groove formed by the sword 9.

From the above it will be seen that as the wheel 20 revolves, each cup 27, as it comes opposite the lower portion of the seed box 16, under action of spring 29 swings outwardly, scooping up some of the seed from the box 16, the cup slowly moving to a closed position as it reaches the highest point in its travel and then remains closed until it comes to a position opposite the opening 34 whereupon spring 29 acts to project the cup 27 outwardly to discharge the seed therefrom. This action is repeated for each succeeding cup and in this manner each cup is alternately filled and emptied for the proper disposal of the seed at intervals as the machine moves over the ground.

It is thought that a clear understanding of the construction, utility and advantages of the invention will be had without a more detailed description.

Having thus described the invention, what is claimed as new is:

1. A seed dropper for planters comprising a casing presenting a seed box open at its top and a substantially cylindrical wheel chamber relative to which said seed box is tangentially disposed, said wheel chamber being provided with an opening in the bottom thereof, a hollow seed wheel rotatably mounted in said wheel chamber and having a rim provided with circumferentially spaced openings, seed cups hinged to said rim at one end of said openings and workable outwardly through said openings to receive seed from said box successively as the wheel rotates and to successively dispense said seed through the opening in said wheel chamber, spring devices normally urging said cups outwardly through the openings therefor in the rim of said wheel, and interengaging pin and cam means on said cups and on the walls of said wheel chamber for moving said cups inwardly of the wheel and for retaining said cups, releasably, inwardly of the wheel for a major portion of the revolution of said wheel and for releasing the cups when the same reach the opening in the bottom of the chamber.

2. A seed dropper for planters comprising a casing presenting a seed box open at its top and a substantially cylindrical wheel chamber relative to which said seed box is tangentially disposed, said wheel chamber being provided with an opening in the bottom thereof, a hollow seed wheel rotatably mounted in said wheel chamber and having a rim provided with circumferentially spaced openings, seed cups hinged to said rim at one end of said openings and workable outwardly through said openings to receive seed from said box successively as the wheel rotates and to successively dispense said seed through the opening in said wheel chamber, spring devices normally urging said cups outwardly through the openings therefor in the rim of said wheel, said wheel chamber being provided on opposite sides thereof with internal cam grooves, said wheel at opposite sides thereof and adjacent each of the openings in the periphery of the wheel being provided with slots, and actuating pins extending laterally from opposite sides of the cup and working through said slots to engage the said cam grooves for moving the cups inwardly to closed position and for retaining said cups in said inwardly closed position for a major portion of the revolution of said wheel.

LAMAR R. KING.